US008100217B2

(12) United States Patent
Crombez

(10) Patent No.: US 8,100,217 B2
(45) Date of Patent: Jan. 24, 2012

(54) VEHICLE WITH HAND CONTROL SYSTEM

(75) Inventor: Dale S. Crombez, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 362 days.

(21) Appl. No.: 12/483,299

(22) Filed: Jun. 12, 2009

(65) Prior Publication Data

US 2010/0313693 A1 Dec. 16, 2010

(51) Int. Cl.
*B60K 26/00* (2006.01)
*G05D 3/00* (2006.01)
*G05G 13/00* (2006.01)

(52) U.S. Cl. .................... 180/315; 180/336; 74/471 XY; 74/484 R; 74/479.01; 701/48

(58) Field of Classification Search .................. 180/315, 180/321, 322, 323, 325, 326, 332, 334, 336; 280/88; 74/471 R, 471 XY, 479.01, 480, 74/481, 482, 484 R, 480 BR; 701/1, 36, 701/41, 48, 49
See application file for complete search history.

(56) References Cited

U.S. PATENT DOCUMENTS 2,777,335 A * 1/1957 Engberg et al. .................. 74/481
3,022,850 A * 2/1962 Bidwell et al. ................ 180/333
4,180,713 A * 12/1979 Gonzales .................... 200/52 R
4,476,954 A * 10/1984 Johnson et al. ............... 180/333
4,722,416 A * 2/1988 Ahnafield ..................... 180/333
4,726,441 A * 2/1988 Conley .......................... 180/322
4,924,960 A * 5/1990 Crill .............................. 180/333
5,025,905 A 6/1991 Lenz
5,086,870 A * 2/1992 Bolduc ......................... 180/333
5,090,514 A * 2/1992 Wright .......................... 180/271
5,448,479 A * 9/1995 Kemner et al. ................. 701/23
5,775,456 A * 7/1998 Reppas ......................... 180/322
5,813,944 A 9/1998 Grindle
6,151,977 A * 11/2000 Menig et al. ................ 74/336 R
6,263,753 B1 7/2001 Froehlich
6,904,345 B2 * 6/2005 Yanaka ........................... 701/41
7,142,963 B2 * 11/2006 Borroni-Bird et al. .......... 701/41
7,195,096 B1 3/2007 Mawhinney
7,703,570 B2 * 4/2010 Ringger et al. ............... 180/336
2004/0002405 A1 1/2004 Laukkanen

* cited by examiner

*Primary Examiner* — Joseph Rocca
(74) *Attorney, Agent, or Firm* — David B. Kelley, Esq.; MacMillan, Sobanski & Todd, LLC

(57) ABSTRACT

The subject of the present invention is a vehicle that includes a hand control system that allows for vehicle acceleration and braking by using hand controls. The hand controls are electronically connected to vehicle controllers, which electronically control the propulsion system and brake system. The hand controls do not mechanically manipulate the accelerator and brake pedals and so can be easily removed from the vehicle.

6 Claims, 3 Drawing Sheets

VEHICLE WITH HAND CONTROL SYSTEM

BACKGROUND OF THE INVENTION

The present invention relates generally to a system for allowing operation of a vehicle by a disabled person by operating some vehicle functions using hand controls.

Vehicle technologies exist that assist drivers with physical disabilities to operate automotive vehicles. Some disabled drivers, for example paraplegics, may operate certain controls with their hands rather than feet. Typically the accelerator pedals and brake pedals are operated with hand levers. In order to do this, these vehicle operators must have their vehicles equipped with unique controls, such as pedal pushers. Pedal pushers typically include handles mounted next to the steering wheel that are attached to bars or other mechanical mechanisms that extend down and in some way mechanically engage the accelerator and brake pedals. While these hand control assemblies allow for operation of a vehicle by a paraplegic, they are typically expensive, difficult to install, and may be in the way of a non-disabled driver who wishes to drive the vehicle.

SUMMARY OF THE INVENTION

An embodiment contemplates a vehicle comprising an electronically controlled propulsion system, an electronically controlled brake system having at least one brake, at least one controller operatively engaging the propulsion system to control a vehicle propulsion and operatively engaging the brake system to control actuation of the at least one brake, an accelerator pedal configured to be moved by a foot of a vehicle operator and communicate a position to the at least one controller, and a brake pedal configured to be moved by the foot of the vehicle operator and communicate a position to the at least one controller. An embodiment of the vehicle also includes a hand control connector system including a hand controls connector configured to be accessible in a passenger compartment of the vehicle and an electrical connection from the hand controls connector to the at least one controller, wherein the at least one controller is configured to arbitrate the accelerator position received from the accelerator pedal when an accelerator position signal is received from the hand control connector system and arbitrate the brake pedal position received from the brake pedal when a brake position signal is received from the hand control connector system.

An embodiment contemplates a vehicle comprising an electronically controlled propulsion system, an electronically controlled brake system having at least one brake, at least one controller operatively engaging the propulsion system to control a vehicle propulsion and operatively engaging the brake system to control actuation of the at least one brake, an accelerator pedal configured to be moved by a foot of a vehicle operator and communicate a position to the at least one controller, and a brake pedal configured to be moved by the foot of the vehicle operator and communicate a position to the at least one controller. The embodiment of the vehicle also includes a hand control system including a hand controls connector configured to be accessible in a passenger compartment of the vehicle, an electrical connection from the hand controls connector to the at least one controller, and a hand controls assembly mounted in a passenger compartment and electronically connected to the hand controls connector, with the hand controls assembly including at least one hand manipulatable mechanism that is configured to be manipulated by a hand of the vehicle operator to produce an accelerator position signal and a brake position signal, the accelerator position signal and the brake position signal communicable to the at least one controller through the hand controls connector.

An advantage of an embodiment is that automotive vehicles may be more easily equipped with hand controls allowing disabled drivers to operate a vehicle without the use of foot pedals. Such a system may be more cost effective and easier to install in a vehicle. Moreover, the hand controls may be more ergonomic for the disabled vehicle operator while not interfering with conventional operation of the vehicle by a non-disabled operator. In addition, the hand control system may be employed to assist a driver training instructor to control a vehicle while riding in a passenger seat.

DETAILED DESCRIPTION

Figure 1:
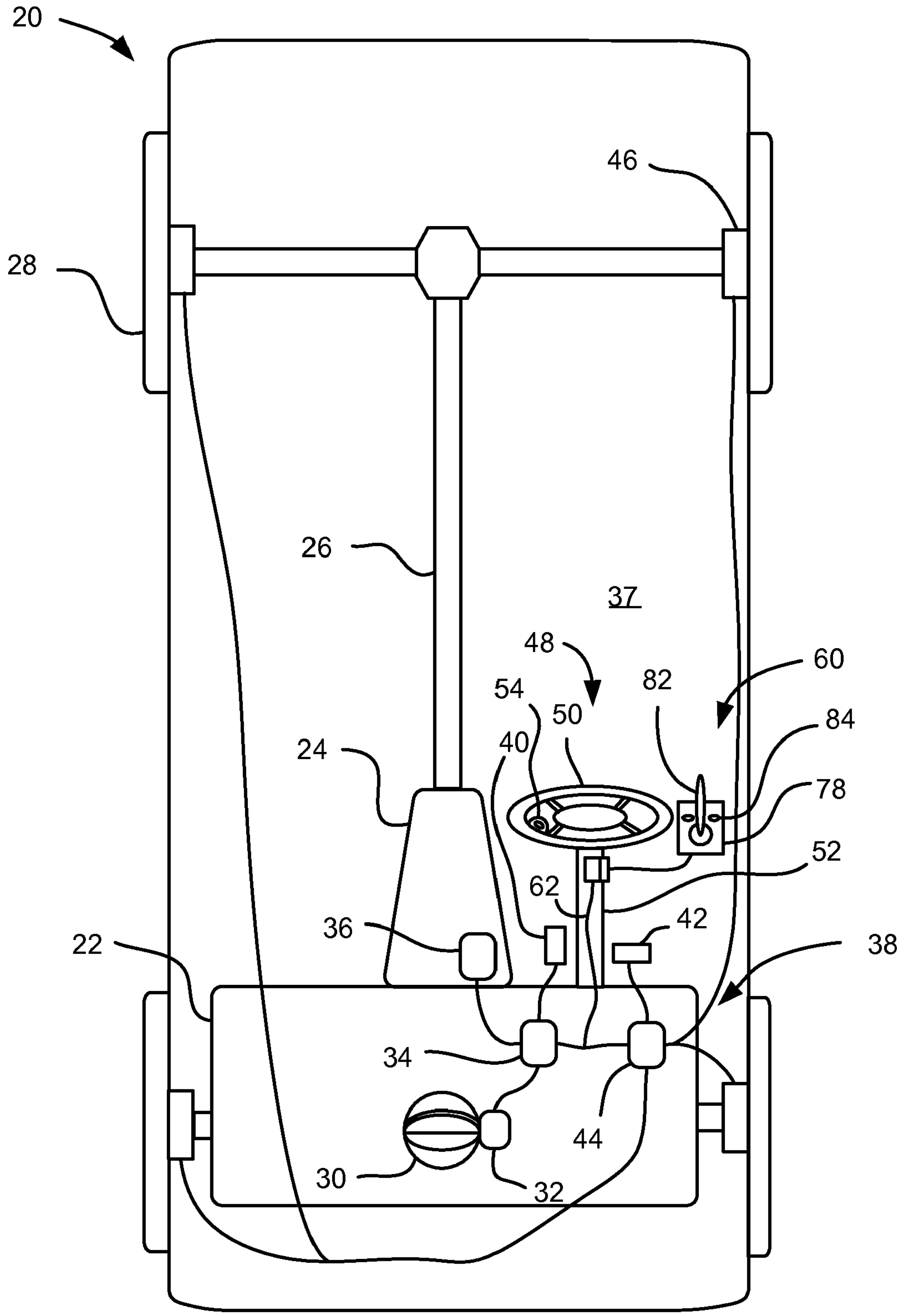
FIG. 1 is a schematic, plan view of a vehicle having a hand control system.
Figure 2:
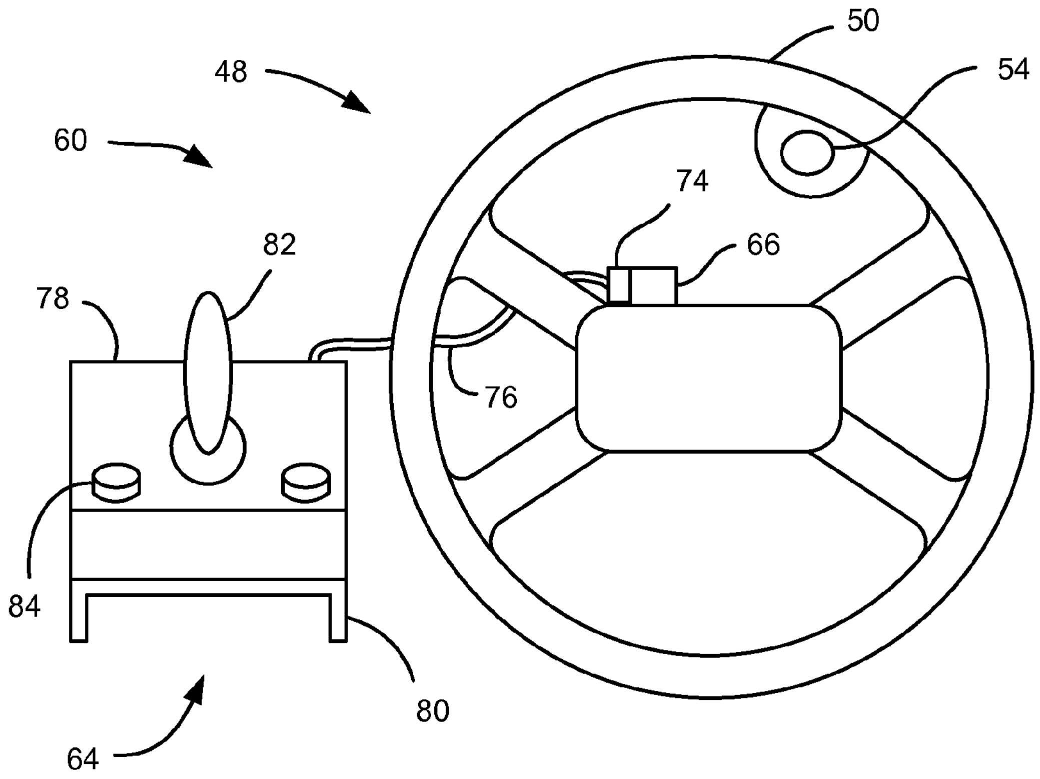
FIG. 2 is a schematic, perspective view of a portion of a hand control system and a portion of a steering assembly.
Figure 3:
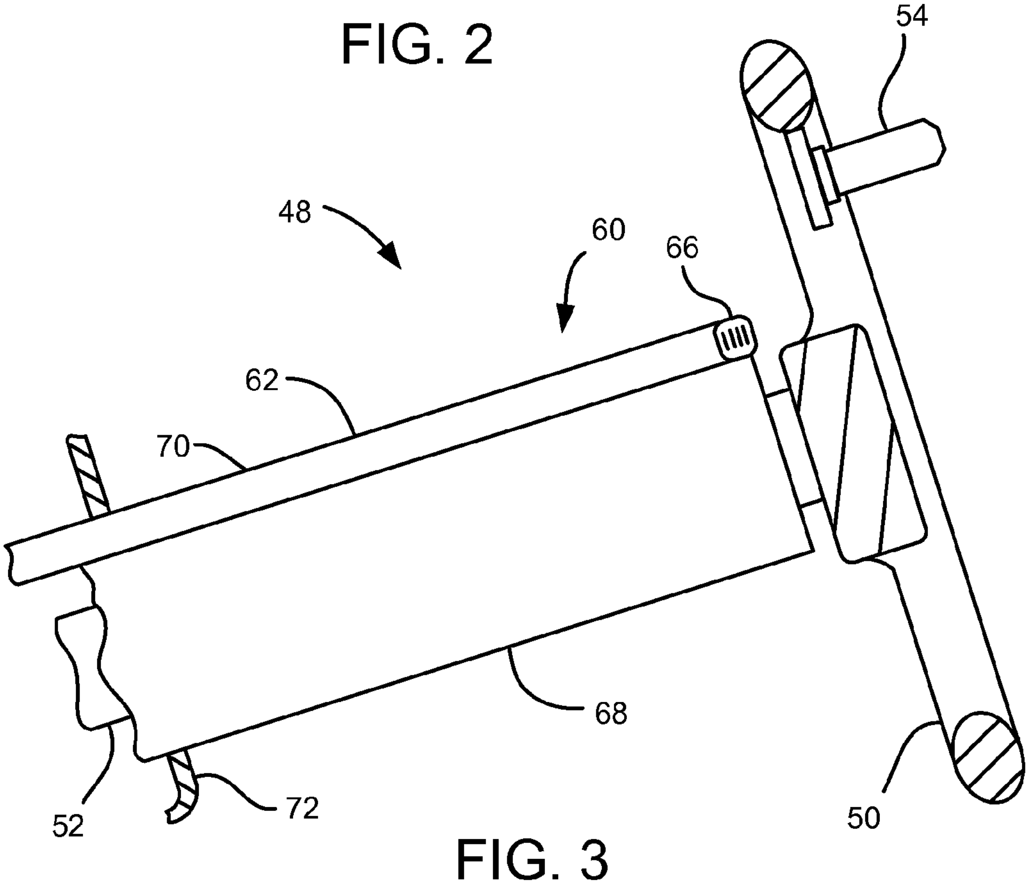
FIG. 3 is a schematic, partially sectional, side elevation view of a portion of a steering assembly and a portion of a hand control connector system, without the hand controls connected to the vehicle.

FIGS. 1-3 show a vehicle 20 that includes an engine 22 that drives an automatic transmission 24, which delivers power to a drivetrain 26, ultimately delivering torque to wheels 28. The engine 22 includes a throttle valve 30 that has an electronic throttle valve actuator 32 for controlling the position of the throttle valve 30. A powertrain controller 34 may be in communication with the throttle valve actuator 32 and with a transmission controller 36 that controls the shifting of the automatic transmission 24. The powertrain controller 34 and transmission controller 36 may be integral or may be separate and may be comprised of various combinations of hardware and software as is known to those skilled in the art.

An accelerator pedal 40 may be located in a passenger compartment 37 in a conventional location for actuation by a foot of a vehicle operator, with the accelerator pedal 40 in communication with the powertrain controller 34. Thus, there is no mechanical linkage between the accelerator pedal 40 and the throttle valve 30. Rather, the accelerator pedal position is an input to the powertrain controller 34, with the powertrain controller 34 actually controlling the position of the throttle valve 30. This is commonly referred to as electronic throttle control. Alternatively, a pressure sensor or force transducer may be employed with the accelerator pedal 40, in which case the resultant pressure or force, as the case may be, is electronically input to the powertrain controller 34, rather than an actual accelerator pedal position. Accordingly, when accelerator pedal position and its input the powertrain controller 34 are mentioned herein, this also includes accelerator pedal pressure or force since any one of these is the result of measuring the interaction of a vehicle operator's foot and the accelerator pedal 40 and electronically communicating this interaction to the powertrain controller 34.

The vehicle 20 also includes a brake system 38. The brake system 38 includes a brake pedal 42 that may be located in the passenger compartment 37 in a conventional location for actuation by a foot of a vehicle operator. The brake pedal 42 is in communication with a brake controller 44. The brake controller 44 may be integral with or separate from the powertrain controller 34 and may be comprised of various combinations of hardware and software as is known to those skilled in the art. The brake pedal position may be input to the brake controller 44, with the brake controller 44 controlling the operation of brakes 46 in the brake system 38. This type of brake system 38 is sometimes referred to as brake-by-wire. Alternatively, the brake system 38 may be a hydraulic brake system with controller control of the hydraulics. In another alternative, a pressure sensor or force transducer may be employed with the brake pedal 42, in which case the resultant pressure or force, as the case may be, is electronically input to the brake controller 44, rather than an actual brake pedal position. Accordingly, when brake pedal position and its input the brake controller 44 are mentioned herein, this also includes brake pedal pressure or force since any one of these is the result of measuring the interaction of a vehicle operator's foot and the brake pedal 42 and electronically communicating this interaction to the brake controller 44.

The vehicle 20 includes a steering assembly 48 having a steering wheel 50 in the passenger compartment 37 positioned for actuation by the hands of a vehicle operator and a steering column 52 that is rotated by the steering wheel 50. The steering column is connected to other portions of the steering assembly 48, which may be conventional, and which cause the front wheels to pivot left or right. An optional steering wheel assist handle 54 may be mounted to the steering wheel 50 in order to make one-handed steering easier. This optional handle 54 may be permanently attached or may be mounted for simple, easy removal.

The vehicle also has a hand control system 60 that includes a hand controls connector system 62, which is configured to remain permanently in the vehicle 20, and a human/machine interface control 64 (shown in FIGS. 1 and 2), which is relatively easily installed and removed from the vehicle 20. The hand controls connector system 62 includes a hand controls connector 66, which may be mounted forward of the steering wheel 50 on a steering column housing 68, and a wire harness 70 or other means of communication connecting the connector 66 to the powertrain controller 34 and brake controller 44. Alternatively, the hand controls connector 66 may be mounted within or under an instrument panel 72. The powertrain controller 34 and brake controller 44 are programmed to allow inputs from the hand controls connector system 62 to provide acceleration and braking commands in place of inputs from the accelerator pedal 40 and brake pedal 42.

The human/machine interface control 64 includes an electrical connector 74 that plugs-in to the hand controls connector 66, and a line 76 from the connector 74 to a hand controls assembly 78. The hand controls assembly 78 may include a mount 80 that is configured to mount and support the hand controls assembly 78 relative to the steering column housing 68 or the instrument panel 72 or both. The hand controls assembly 78 may include hand operated controls such as, for example, a joy stick 82 or push buttons 84 or both. The hand operated controls 82, 84 provide input signals for acceleration and braking that are communicated to and carried out by the powertrain controller 34 and brake controller 44. For example, pushing the right button may arbitrate the input from the accelerator pedal 40 while pushing the left button may arbitrate the input from the brake pedal 42. Or, pushing the joy stick 82 forward may arbitrate acceleration input while pulling back on the joy stick 82 may arbitrate braking input. The type of hand operated controls shown are just examples, and other types may be employed instead if so desired. For example, rotary knobs, sliding knobs or push/pull levers may be employed.

The term "arbitrate" as used herein means that the input from both sources is received by the controller, with the controller determining which input to use based on predetermined factors. For example, the brake controller 44 may arbitrate by taking the highest brake input value between the brake pedal 42 and the hand controls assembly 78 and using that value to determine how hard to apply the brakes. When only the hand brake input is being used, then, the hand brake input, in effect, overrides the input from the brake pedal 42. For acceleration input to a propulsion system, the higher value between the accelerator pedal 40 and the hand control assembly acceleration input may be used by the powertrain controller 34. However, acceleration input arbitration may not always be based only on the higher acceleration input value. For example, one option may be to have the lower of the acceleration inputs used if a braking input from either the foot or hand controls (above a certain level) is received. Other arbitration logic may also be employed, if so desired.

In addition to acceleration and braking hand controls on the human/machine interface control 64, buttons, levers or knobs may also be included on the hand controls assembly 78 that control an electronic parking brake, transmission shifting if the transmission system is a shift-by-wire system, and steering if the steering system is a steer-by-wire system. The software adjustments to the various controllers, then, would allow for parking brake, shifting or steering inputs from the hand controls assembly 78 to arbitrate these inputs from the conventional parking brake lever, gear shifter and steering wheel, respectively.

It should be noted, while the present embodiment describes electronic control of a throttle valve, this acceleration control also applies to vehicles that do not employ a throttle valve. Such vehicles may have a propulsion system that provides vehicle acceleration by a means other than or in addition to an internal combustion engine. For example, electric, hybrid and other types of vehicles may employ the accelerator pedal position to indicate the intended acceleration of the vehicle but employ a means other than a throttle valve to achieve the acceleration. Thus, the throttle valve control is just one means of controlling the propulsion system in response to a position of the accelerator pedal or position of the corresponding hand controls.

Figure 4:
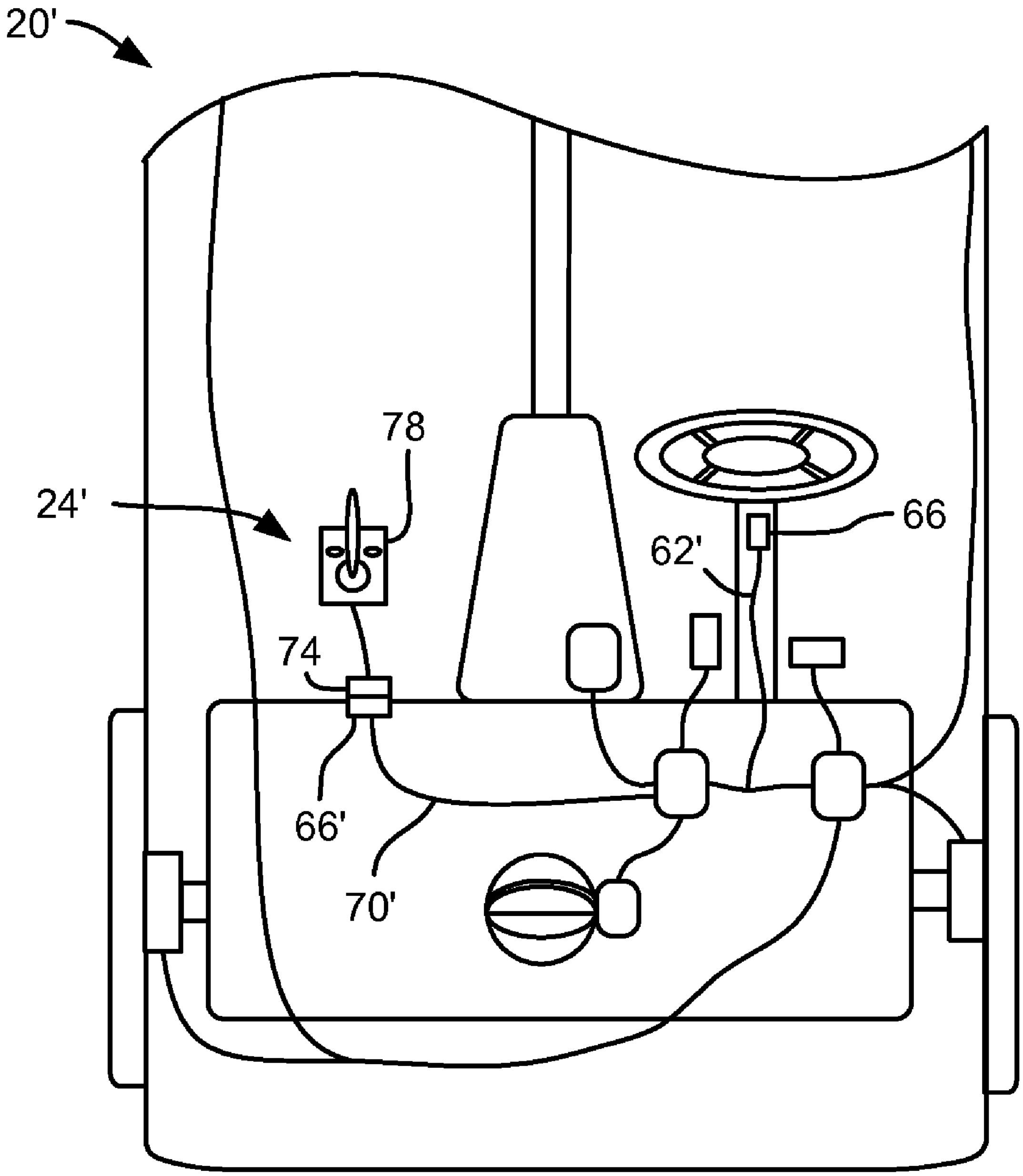
FIG. 4 is a schematic, plan view of a portion of a vehicle, similar to FIG. 1, but illustrating a second embodiment.

FIG. 4 illustrates an alternate embodiment where the human/machine interface control 64' is configured for use in a driver's education vehicle 20' rather than (or in addition to) use with a disabled driver. In this embodiment the hand controls connector system 62' includes a second hand controls connector 66' and a second wire harness 70' that are located on a passenger side of the instrument panel. This allows the electrical connector 74 to be plugged-in to the hand controls connector 66' on the passenger side so that a driving instructor seated in a passenger seat (not shown) can operate the hand control assembly 78 while a student driver operates the vehicle 20' in a conventional fashion. This may allow the driving instructor to arbitrate (which may include overriding) the student braking and acceleration.

Alternatively, the vehicle 20' may avoid a second hand controls connector 66' and second wiring harness 70' by using a longer line (not shown) with the hand control assembly. With this configuration, the electrical connector will plug-in to the hand controls connector 66 mounted on the driver's side of the vehicle 20' and the longer line will extend transversely across the vehicle to the passenger's side. Thus, the hand controls assembly will still be mounted in front of the driving instructor, even with only one hand controls connector 66 in the vehicle. As another alternative to the embodiment of FIG. 4, the control assembly on the passenger side of the vehicle may be operable by foot pedals accessible to the driving instructor instead of hand controls.

While certain embodiments of the present invention have been described in detail, those familiar with the art to which this invention relates will recognize various alternative designs and embodiments for practicing the invention as defined by the following claims.

What is claimed is:

1. A vehicle comprising:

an electronically controlled propulsion system;

an electronically controlled brake system having at least one brake;

at least one controller operatively engaging the propulsion system to control a vehicle propulsion and operatively engaging the brake system to control actuation of the at least one brake;

an accelerator pedal configured to be moved by a foot of a vehicle operator and communicate a position to the at least one controller;

a brake pedal configured to be moved by the foot of the vehicle operator and communicate a position to the at least one controller;

a hand control system including a hand controls connector configured to be accessible in a passenger compartment of the vehicle, an electrical connection from the hand controls connector to the at least one controller, and a hand controls assembly mounted in a passenger compartment and electronically connected to the hand controls connector, the hand controls assembly including at least one hand manipulatable mechanism that is configured to be manipulated by a hand of the vehicle operator to produce an accelerator position signal and a brake position signal, the accelerator position signal and the brake position signal communicable to the at least one controller through the hand controls connector;

a transmission having electronically controlled shifting, wherein the at least one controller operatively engages the transmission and is configured to cause shifting of the transmission;

a gear shift lever mounted in the passenger compartment and manipulatable by the vehicle operator to choose a gear setting; and wherein the hand controls assembly includes transmission hand manipulatable mechanism that is configured to be manipulated by a hand of the vehicle operator to produce gear shift position signal, and wherein the at least one controller is configured to arbitrate the gear setting received from the gear shift lever when the gear shift position signal is received from the hand control system.

2. The vehicle of claim 1 wherein the at least one controller is configured to arbitrate the accelerator position received from the accelerator pedal when the accelerator position signal is received from the hand control system and arbitrate the brake pedal position received from the brake pedal when the brake position signal is received from the hand control system.

3. The vehicle of claim 1 wherein the hand controls assembly is mounted adjacent to a steering wheel on a driver's side of the vehicle and configured for hand operation by the vehicle operator.

4. The vehicle of claim 1 wherein the hand control assembly is mounted on a passenger side of the passenger compartment and configured for hand operation by a person other than the vehicle operator.

5. The vehicle of claim 1 wherein the hand control system includes a second hand controls connector configured to be accessible in a passenger compartment of the vehicle, and a second electrical connection from the second hand controls connector to the at least one controller.

6. The vehicle of claim 1 wherein the hand controls connector is mounted on the steering column.

* * * * *